US010821800B2

(12) United States Patent
Mullett et al.

(10) Patent No.: US 10,821,800 B2
(45) Date of Patent: Nov. 3, 2020

(54) HEATING, VENTILATION, AND AIR CONDITIONING SYSTEM

(71) Applicants: DENSO International America, Inc., Southfield, MI (US); DENSO CORPORATION, Kariya (JP)

(72) Inventors: Reilly Mullett, Livonia, MI (US); Hiroshi Fukagawa, Novi, MI (US); Hayato Asano, West Bloomfield, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 158 days.

(21) Appl. No.: 16/180,148

(22) Filed: Nov. 5, 2018

(65) Prior Publication Data

US 2019/0351730 A1  Nov. 21, 2019

Related U.S. Application Data

(60) Provisional application No. 62/671,470, filed on May 15, 2018.

(51) Int. Cl.
*B60H 1/00* (2006.01)
*B60S 1/54* (2006.01)

(52) U.S. Cl.
CPC ..... *B60H 1/00028* (2013.01); *B60H 1/00671* (2013.01); *B60H 2001/002* (2013.01); *B60H 2001/00092* (2013.01); *B60H 2001/00107* (2013.01); *B60H 2001/00721* (2013.01); *B60S 1/54* (2013.01)

(58) Field of Classification Search
CPC ............ B60H 1/00028; B60H 1/00671; B60H 2001/00092; B60H 2001/00107; B60H 2001/002; B60H 2001/00721; B60S 1/54
See application file for complete search history.

(56) References Cited

U.S. PATENT DOCUMENTS 4,537,245 A * 8/1985 Nishimura ......... B60H 1/00842
165/203
4,718,244 A * 1/1988 Kobayashi ................ B60S 1/54
236/44 C (Continued)

FOREIGN PATENT DOCUMENTS

DE   102015110559 A1 * 1/2017 ......... B60H 1/00064
EP        3081410 A2 * 10/2016 ......... B60H 1/00021
WO  WO-2018004203 A1 * 1/2018 ......... B60H 1/00064

*Primary Examiner* — Devon Russell
(74) *Attorney, Agent, or Firm* — Harness, Dickey & Pierce, P.L.C.

(57) ABSTRACT

A heating, ventilation, and air conditioning (HVAC) system for a vehicle. The HVAC system includes an HVAC case. The HVAC case has a first inlet and a second inlet. The first inlet is in receipt of airflow from a front blower. The second inlet is in receipt of airflow from a rear blower. A front foot outlet directs airflow towards the feet of occupants at a front of the vehicle. A rear foot outlet directs airflow from the rear blower towards a rear of the vehicle. A rear-to-front airflow control door is movable to direct airflow generated by the rear blower and heated by a heater core through the rear foot outlet, through the front foot outlet, or simultaneously through both the rear foot outlet and the front foot outlet.

20 Claims, 5 Drawing Sheets

(56) References Cited

U.S. PATENT DOCUMENTS

| | | | | |
|---|---|---|---|---|
| 4,901,788 A * | 2/1990 | Doi | ............... | B60H 1/00842 |
| | | | | 165/204 |
| 5,016,704 A * | 5/1991 | Ono | ............... | B60H 1/00064 |
| | | | | 165/137 |
| 5,181,553 A * | 1/1993 | Doi | ............... | B60H 1/00842 |
| | | | | 165/203 |
| 6,311,763 B1 * | 11/2001 | Uemura | ............ | B60H 1/00664 |
| | | | | 165/43 |
| 6,352,102 B1 * | 3/2002 | Takechi | ............ | B60H 1/00064 |
| | | | | 165/203 |
| 6,874,575 B2 * | 4/2005 | Kim | ............... | B60H 1/00064 |
| | | | | 165/204 |
| 9,102,214 B2 * | 8/2015 | Kishi | ............... | B60H 1/00849 |
| 2009/0117841 A1 * | 5/2009 | Goto | ............... | B60H 1/00064 |
| | | | | 454/127 |
| 2018/0162191 A1 * | 6/2018 | Lee | ............... | B60H 1/00842 |
| 2018/0162192 A1 * | 6/2018 | Lee | ............... | B60H 1/0005 |

* cited by examiner

HEATING, VENTILATION, AND AIR CONDITIONING SYSTEM

CROSS-REFERENCE TO RELATED APPLICATION

This application claims the benefit and priority of U.S. Patent Application Ser. No. 62/671,470 filed on May 15, 2018, the entire disclosure of which is incorporated herein by reference.

FIELD

The present disclosure relates to a heating, ventilation, and air conditioning (HVAC) system, such as an HVAC system for a vehicle.

BACKGROUND

This section provides background information related to the present disclosure, which is not necessarily prior art.

Some vehicle heating, ventilation, and air conditioning (HVAC) systems generate two-layer airflow, which directs recirculated air to foot outlets of the passenger cabin, and directs fresh air to defrost outlets. As a result, vehicle warmup time is improved, as is the overall efficiency of the system. Furthermore, providing fresh air to the defrost outlets reduces or eliminates window fogging. While such two-layer HVAC systems are suitable for their intended use, they are subject to improvement. For example, current two-layer HVAC systems include a two-layer blower having a fresh air outlet and a recirculation air outlet, which are vertically offset from one another. Such a blower configuration presents undesirable complexities when the HVAC case connected thereto has inlets that are horizontally spaced apart from one another. The present disclosure advantageously provides for an improved HVAC system that is more efficient and less complex as compared to current HVAC systems. One skilled in the art will appreciate that the present disclosure provides for numerous additional advantages and unexpected results in addition to those set forth herein.

SUMMARY

This section provides a general summary of the disclosure, and is not a comprehensive disclosure of its full scope or all of its features.

The present disclosure includes a heating, ventilation, and air conditioning (HVAC) system for a vehicle. The HVAC system includes an HVAC case. The HVAC case has a first inlet and a second inlet. The first inlet is in receipt of airflow from a front blower. The second inlet is in receipt of airflow from a rear blower. A front foot outlet directs airflow towards the feet of occupants at a front of the vehicle. A rear foot outlet directs airflow from the rear blower towards a rear of the vehicle. A rear-to-front airflow control door is movable to direct airflow generated by the rear blower and heated by a heater core through the rear foot outlet, through the front foot outlet, or simultaneously through both the rear foot outlet and the front foot outlet.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
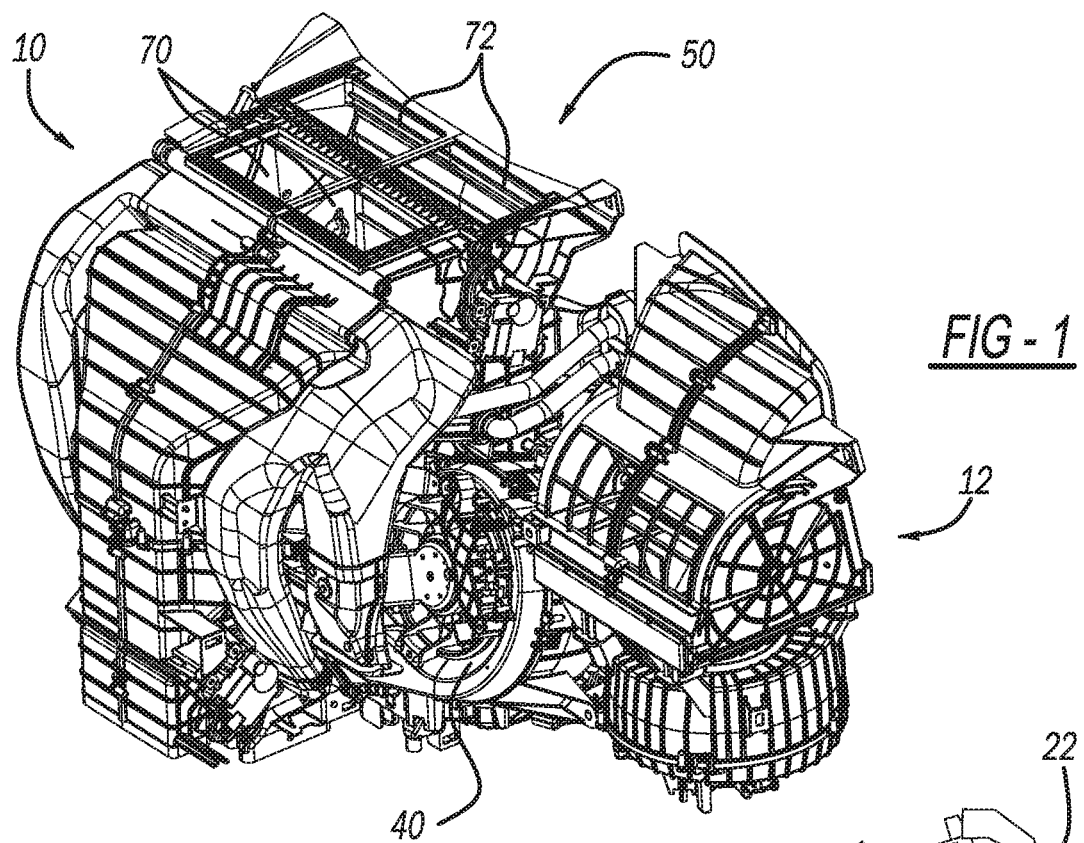
FIG. 1 is a perspective view of a heating, ventilation, and air conditioning (HVAC) system in accordance with the present disclosure.

FIG. 1 illustrates a heating, ventilation, and air conditioning (HVAC) system 10 in accordance with the present disclosure. The HVAC system 10 may be a vehicle HVAC system, such as described in the examples herein. The HVAC system 10 may be configured for use with any suitable vehicle, such as any suitable passenger vehicle, mass transit vehicle, utility vehicle, commercial vehicle, construction vehicle/equipment, military vehicle/equipment, watercraft, aircraft, etc. The HVAC system 10 may also be used with any suitable non-vehicular application.

Figure 2:
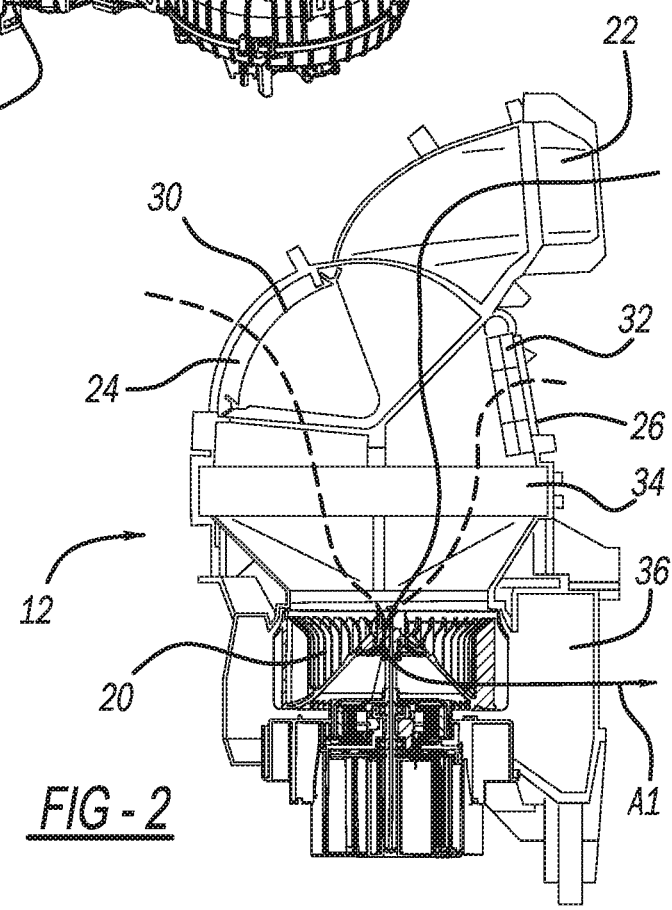
FIG. 2 is a cross-sectional view of a front blower of the HVAC system of FIG. 1.

The HVAC system 10 generally includes a front blower 12, a rear blower 40, and an HVAC case 50. With continued reference to FIG. 1 and additional reference to FIG. 2, the front blower 12 will now be described in additional detail. The front blower 12 includes any suitable airflow generating device, such as a rotor 20. The front blower 12 defines a fresh air inlet 22, which is arranged in any suitable location where fresh air (i.e., air external to the passenger cabin of the vehicle that the HVAC system 10 is installed in) is accessible in order for the rotor 20 to draw fresh air into the passenger cabin. The front blower 12 further defines a first recirculated air inlet 24 and a second recirculated air inlet 26. Each one of the first and second recirculated air inlets 24 and 26 is arranged at any suitable position within the vehicle to receive recirculated air from the vehicle passenger cabin.

When activated, the rotor 20 draws air from the passenger cabin into the front blower 12 through the first and second recirculated air inlets 24 and 26. The activated rotor 20 also draws in fresh air through the fresh air inlet 22. To control airflow into the front blower 12 through the fresh air inlet 22, the first recirculated air inlet 24, and the second recirculated air inlet 26, the front blower 12 further includes a first door 30 and a second door 32. The first and second doors 30 and 32 may be any suitable airflow control doors arranged at any suitable position to control airflow into the front blower 12. In the example illustrated, the first door 30 is a first rotary door movable between the first recirculated air inlet 24 and an airflow path of the fresh air inlet 22. The first door 30 is thus movable to allow airflow into the front blower 12 from the first recirculated air inlet 24 (but not the fresh air inlet 22), from the fresh air inlet 22 (but not the first recirculated air inlet 24), or allow airflow into the front blower 12 through both the fresh air inlet 22 and the first recirculated air inlet 24 when the first door 30 is moved to an intermediate position. The second door 32 can be any door suitable to control airflow through the second recirculated air inlet 26. For example and as illustrated, the second door 32 is any suitable flag door movable to control airflow through the second recirculated air inlet 26.

Figure 3:
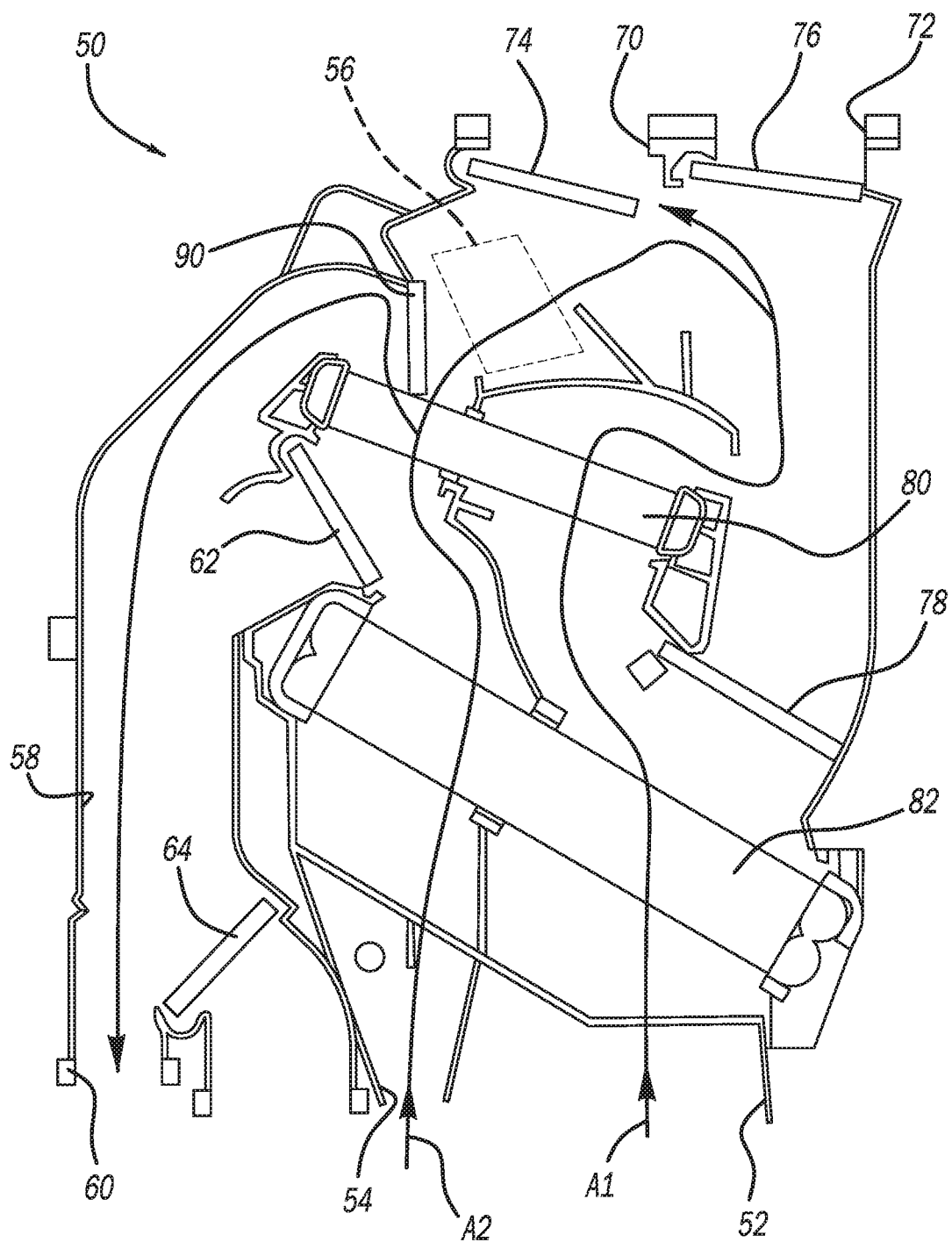
FIG. 3 is a cross-sectional view of an HVAC case of the HVAC system of FIG. 1, the HVAC case configured in a first passenger cabin warmup mode.

The front blower 12 further includes a blower outlet 36. The blower outlet 36 is a single outlet through which fresh air from an exterior of the vehicle, recirculated air from the passenger cabin, or a combination of fresh and recirculated air exits the front blower 12 depending upon the position of the doors 30 and 32. The front blower 12 may further include a filter 34, which filters dust, dirt, and any other undesirable particulates from the air. The blower outlet 36 is a horizontal outlet aligned with a first inlet 52 of the HVAC case 50, as illustrated in FIG. 3. Thus airflow A1 blown out from within the front blower 12 by the rotor 20 enters the HVAC case 50 through the first inlet 52 of FIG. 3.

The rear blower 40 is any suitable airflow generator arranged and configured to draw airflow into the rear blower 40 from the passenger cabin of the vehicle that the HVAC system 10 is installed in. The rear blower 40 directs the recirculated airflow from the passenger cabin into the HVAC case 50 through a second inlet 54 of the HVAC case 50, which in the example of FIG. 3 is arranged adjacent to the first inlet 52. The first inlet 52 and the second inlet 54 are arranged horizontally relative to one another.

With continued reference to FIG. 3, the HVAC case 50 further defines a front foot outlet 56. The front foot outlet 56 is arranged such that airflow exiting the HVAC case 50 through the front foot outlet 56 flows to a foot area (i.e., floor area) of a front portion of the passenger cabin. The HVAC case 50 further defines a rear airflow path 58, which directs airflow to a rear foot outlet 60. The rear foot outlet 60 is arranged to direct airflow to a rear of the vehicle, specifically to a foot area (i.e., floor area) of a rear of the passenger cabin. The HVAC case 50 also includes a first rear airflow control door 62 and a second rear airflow control door 64, which can be any suitable airflow control doors for further controlling airflow into and out of the rear airflow path 58.

The HVAC case 50 also defines a front defrost outlet 70 and a front vent 72, as illustrated in FIGS. 3-5 and FIG. 1, for example. The front defrost outlet 70 is arranged to direct airflow out from within the HVAC case 50 to a windshield of the vehicle in order to defrost the windshield. The front vent 72 provides vented airflow to the passenger cabin, such as towards the faces of individuals seated at a front of the passenger cabin. Airflow through the front defrost outlet 70 is controlled by any suitable defrost airflow control door 74, and airflow through the front vent 72 is controlled by any suitable vent airflow control door 76. Airflow control door 78 may also be included to control airflow in the direction of the front defrost outlet 70 and the front vent 72.

The HVAC case 50 also includes a heater core 80. The heater core 80 is arranged in the airflow path of airflow A1 flowing into the HVAC case 50 through the first inlet 52 from the front blower 12. The heater core 80 is also arranged along the path of airflow A2 generated by the rear blower 40 and entering the HVAC case 50 through the second inlet 54. The heater core 80 is any suitable heating device configured to heat the airflow A1 and A2 when activated. The HVAC case 50 may also include an evaporator 82 arranged along airflow A1 and airflow A2. When activated, the evaporator 82 will cool the airflow A1 and the airflow A2.

The HVAC case 50 also includes a rear-to-front airflow control door 90. The rear-to-front airflow control door 90 is arranged between the front foot outlet 56 and the rear airflow path 58 leading to the rear foot outlet 60. The rear-to-front airflow control door 90 is movable to direct airflow A2 generated by the rear blower 40 and heated by the heater core 80 through the front foot outlet 56, through the rear foot outlet 60, or simultaneously through both the front foot outlet 56 and the rear foot outlet 60. Specifically and as illustrated in the example of FIG. 3, in a passenger cabin warmup mode the rear-to-front airflow control door 90 is illustrated in the intermediate position between the front foot outlet 56 and the rear foot outlet 60 to allow airflow A2 from the rear blower 40, which is recirculated airflow from the passenger cabin, to flow both to the front foot outlet 56 and the rear foot outlet 60. Arranging the rear-to-front airflow control door 90 in the position of FIG. 3 advantageously directs recirculated, heated, airflow A2 to the feet of those seated at a front of the passenger cabin to warm the occupants, as well as to the rear foot outlet 60 to warm any passengers seated at a rear of the vehicle. Because the recirculated airflow A2 will typically be warmer than "fresh" air at an exterior of the vehicle during cool conditions, the passenger cabin will be warmed more quickly than if only fresh outside airflow were heated. As also illustrated in FIG. 3, the defrost airflow control door 74 may be partially opened to allow both airflow A2 and airflow A1 to flow through the front defrost outlet 70 to defrost the windshield. By directing both airflow A1 and airflow A2 to the windshield, the defrost procedure can advantageously be performed more quickly and without fogging, as compared to the prior art.

Figure 4:
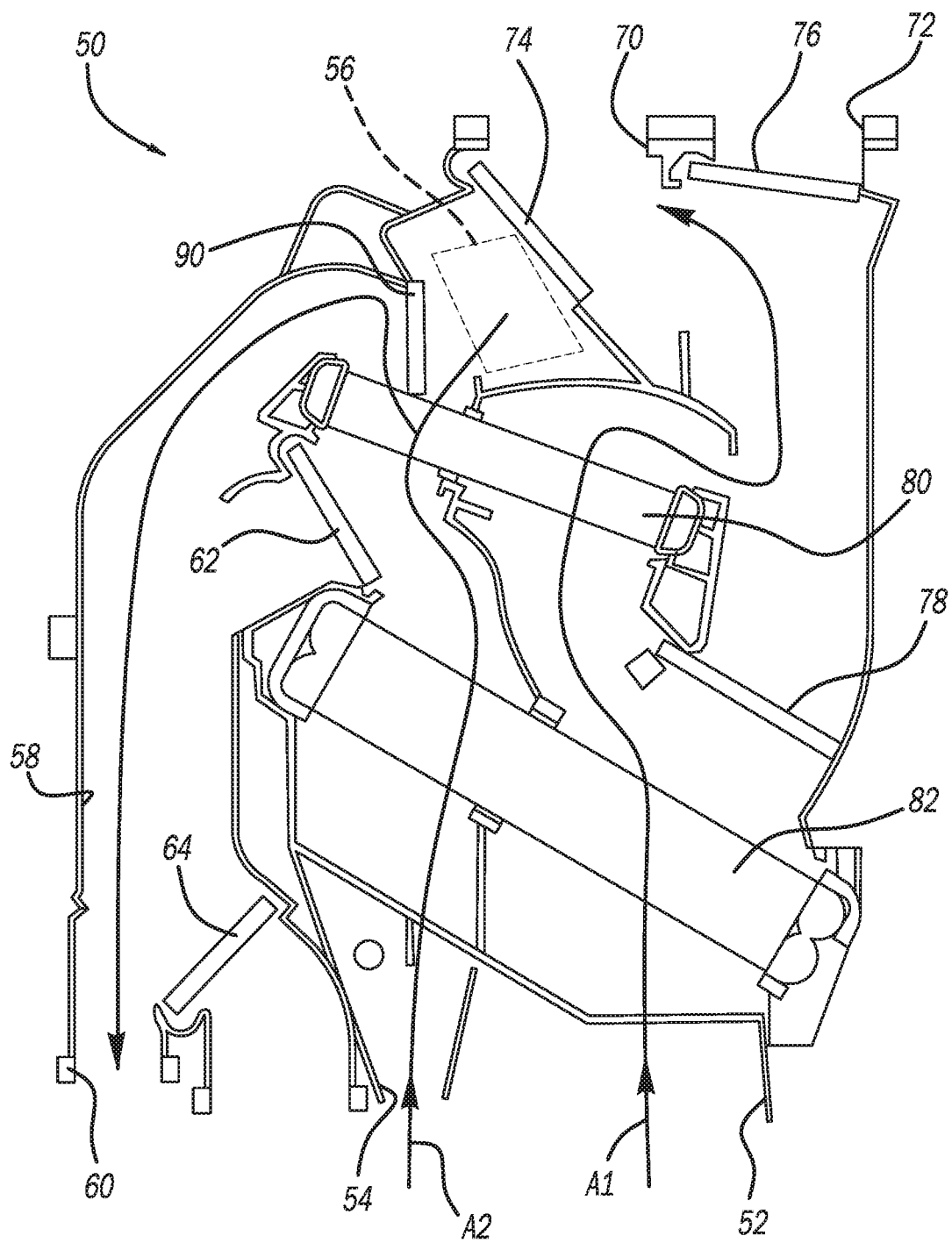
FIG. 4 is a cross-sectional view of the HVAC case of the HVAC system of FIG. 1, the HVAC case configured in a second passenger cabin warmup mode.

FIG. 4 illustrates another passenger cabin warmup mode in accordance with the present disclosure. The configuration of the HVAC case 50 in FIG. 4 is the same as illustrated in FIG. 3, except that the defrost airflow control door 74 is rotated to restrict airflow A2 from flowing through the defrost outlet 70. This configuration is a true two-layer airflow whereby only heated recirculated airflow from the passenger cabin is directed to the front foot outlet 56 and the rear foot outlet 60, and only fresh outside airflow A1 from the front blower 12 is directed to the defrost outlet 70 and ultimately to the windshield to prevent fogging.

Figure 5:
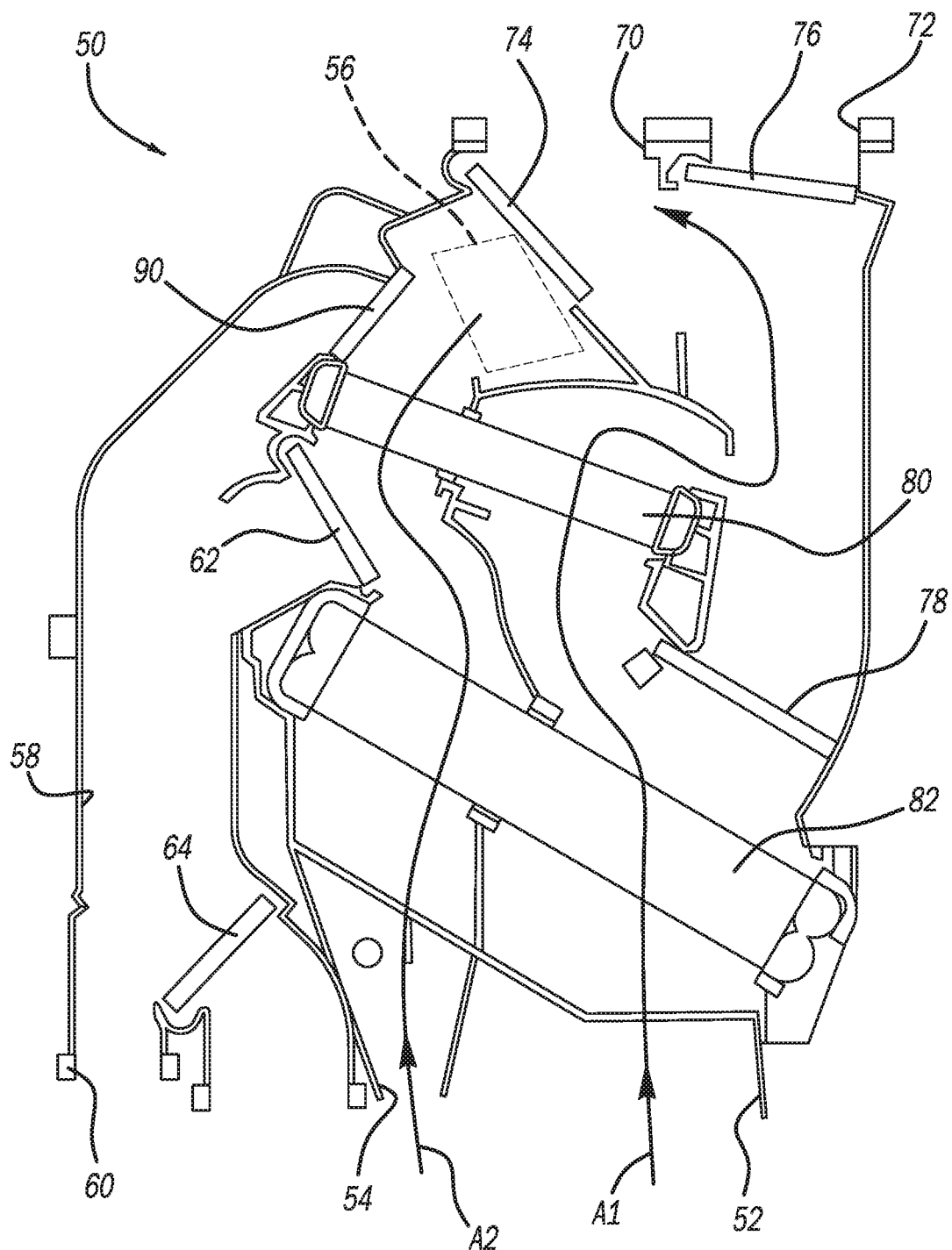
FIG. 5 is a cross-sectional view of the HVAC case of the HVAC system of FIG. 1, the HVAC case configured in a third passenger cabin warmup mode.

With reference to FIG. 5, another passenger cabin warmup mode is illustrated. In the configuration of FIG. 5, the rear-to-front airflow control door 90 is rotated to prevent airflow A2 from flowing to the rear foot outlet 60, and the defrost airflow control door 74 is arranged to prevent airflow A2 from flowing to the front defrost outlet 70. Thus all of the recirculated airflow A2 generated by the rear blower 40 is directed to the front foot outlet 56. The configuration of FIG. 5 is a true two-layer airflow configuration in which only fresh airflow A1 blown by the front blower 12 from an exterior vehicle into the first inlet 52 is directed to the front defrost outlet 70 to prevent fogging and only recirculated airflow A2 generated by the rear blower 40 from the passenger cabin is directed to the front foot outlet 56.

Figure 6:
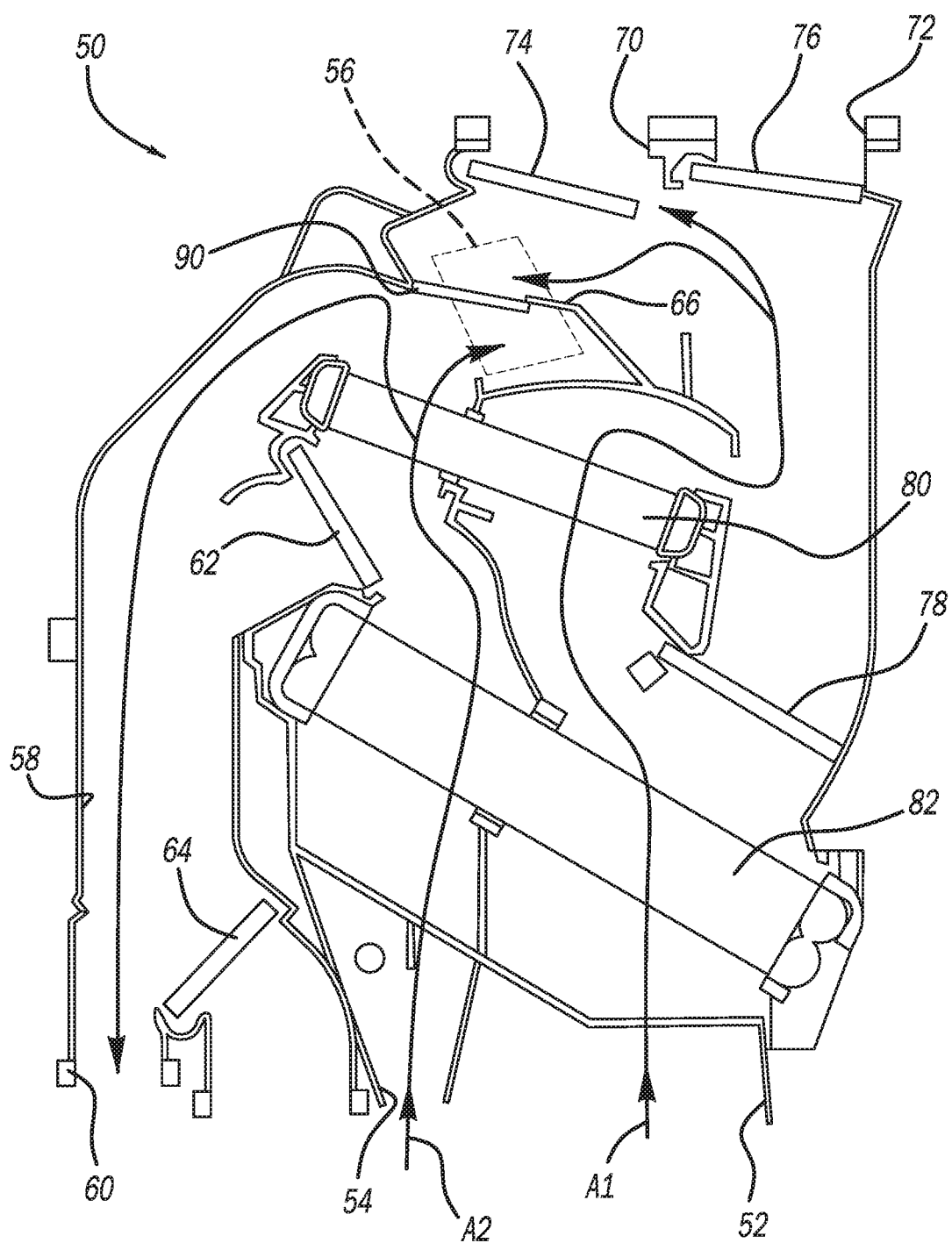
FIG. 6 is a cross-sectional view of the HVAC case of the HVAC system of FIG. 1, the HVAC case configured in a fourth passenger cabin warmup mode.

FIG. 6 illustrates an additional passenger cabin warmup mode in accordance with the present disclosure. In the configuration of FIG. 6, the rear-to-front airflow control door 90 is rotated to extend across the front foot outlet 56 to generally divide the front foot outlet 56 into a top half and a bottom half. This reduces any likelihood of rear airflow A2 going to the front defrost by creating an airflow choke-point.

The top half is free to receive airflow A1 through the front foot outlet 56, and the bottom half is free to receive airflow A2 through the front foot outlet 56. Wall 66 of the HVAC case 50 is extended to mate with the door 90 to prevent airflow A1 and A2 from flowing across the door 90, and completely seal off the rear to front defrost path.

The present disclosure thus advantageously achieves two-layer blower performance without the need for a two-layer blower with vertically arranged outlets as is the case with current two-layer HVAC assemblies. Instead, the present disclosure advantageously includes the front blower 12 with only a single blower outlet 36, which is aligned with first inlet 52 of the HVAC case 50. Inclusion of the rear-to-front airflow control door 90 advantageously directs recirculated airflow A2, when in a passenger cabin warmup mode, to the front foot outlet 56 to facilitate heating the passenger cabin. One skilled in the art will appreciate that the present disclosure provides numerous additional advantages and unexpected results.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A heating, ventilation, and air conditioning (HVAC) system for a vehicle, the HVAC system comprising:
    an HVAC case including:
        a first inlet in receipt of airflow from a front blower;
        a second inlet in receipt of airflow from a rear blower;
        a heater core;
        a front foot outlet that directs airflow towards feet of occupants at a front of the vehicle;
        a rear foot outlet that directs airflow from the rear blower towards a rear of the vehicle; and
        a rear-to-front airflow control door movable to direct airflow generated by the rear blower and heated by the heater core through the rear foot outlet, through the front foot outlet, or simultaneously through both the rear foot outlet and the front foot outlet;
    wherein the rear-to-front airflow control door is movable to extend across, and partially overlap, the front foot outlet to divide the front foot outlet into a first opening area and a second opening area such that airflow generated by the rear blower and heated by the heater core flows through the first opening area of the front foot outlet and through the rear foot outlet, and airflow generated by the front blower flows through the second opening area of the front foot outlet.

2. The HVAC system of claim 1, wherein the rear-to-front airflow control door is between the rear foot outlet and the front foot outlet.

3. The HVAC system of claim 1, further comprising an evaporator between the heater core and both the first inlet and the second inlet.

4. The HVAC system of claim 1, further comprising:
a defrost outlet that directs airflow to a windshield of the vehicle to defrost the windshield;
wherein the rear-to-front airflow control door is movable to direct airflow generated by the rear blower and heated by the heater core to the defrost outlet, and through the defrost outlet when a defrost airflow control door at the defrost outlet is open.

5. The HVAC system of claim 1, further comprising the front blower that generates airflow through the front inlet, and the rear blower that generates airflow through the rear inlet.

6. The HVAC system of claim 5, wherein the front blower has a single blower outlet aligned with the first inlet.

7. The HVAC system of claim 6, wherein the front blower includes a fresh air inlet, at least one recirculated air inlet, and at least one blower control door that directs airflow from at least one of the fresh air inlet and the recirculated air inlet to the single blower outlet.

8. The HVAC system of claim 7, wherein in a passenger cabin warmup mode:
the at least one blower control door is positioned such that the front blower directs fresh airflow, or a combination of fresh airflow and recirculated airflow, through the first inlet of the HVAC case;
the rear blower directs recirculated airflow from the passenger cabin through the second inlet of the HVAC case; and
the rear-to-front airflow control door is positioned to direct the recirculated airflow from the second inlet to the front foot outlet.

9. The HVAC system of claim 8, wherein in a non-passenger cabin warmup mode the rear-to-front airflow control door is positioned to restrict the recirculated airflow from the second inlet from flowing to the front foot outlet.

10. A heating, ventilation, and air conditioning (HVAC) system for a vehicle, the HVAC system comprising:
a front blower;
a rear blower;
an HVAC case including:
a first inlet in receipt of airflow from the front blower;
a second inlet in receipt of airflow from the rear blower;
a heater core;
a front foot outlet that directs airflow towards feet of occupants at a front of the vehicle;
a defrost outlet that directs airflow to a windshield of the vehicle to defrost the windshield;
a rear foot outlet that directs airflow from the rear blower towards a rear of the vehicle; and
a rear-to-front airflow control door movable to direct airflow generated by the rear blower and heated by the heater core through the rear foot outlet, through the front foot outlet, or simultaneously through both the rear foot outlet and the front foot outlet;
wherein the rear-to-front airflow control door is movable to extend across, and partially overlap, the front foot outlet to divide the front foot outlet into a first opening area and a second opening area such that airflow generated by the rear blower and heated by the heater core flows through the first opening area of the front foot outlet and through the rear foot outlet, and airflow generated by the front blower flows through the second opening area of the front foot outlet; and
wherein the rear-to-front airflow control door blocks airflow from the rear blower to the defrost outlet when the rear-to-front airflow control door extends across, and partially overlaps, the front foot outlet.

11. The HVAC system of claim 10, wherein the rear-to-front airflow control door is between the rear foot outlet and the front foot outlet.

12. The HVAC system of claim 10, further comprising an evaporator between the heater core and both the first inlet and the second inlet.

13. The HVAC system of claim 10, wherein the front blower has a single blower outlet aligned with the first inlet.

14. The HVAC system of claim 13, wherein the front blower includes a fresh air inlet, at least one recirculated air inlet, and at least one blower control door that directs airflow from at least one of the fresh air inlet and the recirculated air inlet to the single blower outlet.

15. The HVAC system of claim 14, wherein in a passenger cabin warmup mode:
the at least one blower control door is positioned such that the front blower directs fresh airflow, or a combination of fresh airflow and recirculated airflow, through the first inlet of the HVAC case;
the rear blower directs recirculated airflow from the passenger cabin through the second inlet of the HVAC case; and
the rear-to-front airflow control door is positioned to direct the recirculated airflow from the second inlet to the front foot outlet.

16. The HVAC system of claim 15, wherein in a non-passenger cabin warmup mode the rear-to-front airflow control door is positioned to restrict the recirculated airflow from the second inlet from flowing to the front foot outlet.

17. A heating, ventilation, and air conditioning (HVAC) system for a vehicle, the HVAC system comprising:
a front blower;
a rear blower;
an HVAC case defining a front blower inlet, a rear blower inlet, a front foot outlet, a rear foot outlet, a front defrost outlet, and a front vent outlet;
a rear-to-front airflow control door movable to direct airflow from the rear blower that has entered the HVAC case through the rear blower inlet to at least one of the front foot outlet and the rear foot outlet;
wherein in a passenger cabin warmup mode the rear-to-front airflow control door is positioned to direct airflow from the rear blower to the front foot outlet;
wherein the rear-to-front airflow control door is movable to extend across, and partially overlap, the front foot outlet to divide the front foot outlet into a first opening area and a second opening area such that airflow generated by the rear blower and heated by the heater core flows through the first opening area of the front foot outlet and through the rear foot outlet, and airflow generated by the front blower flows through the second opening area of the front foot outlet; and
wherein the rear-to-front airflow control door blocks airflow from the rear blower to the defrost outlet and the front vent outlet when the rear-to-front airflow control door extends across, and partially overlaps, the front foot outlet.

18. The HVAC system of claim 17, wherein in the passenger cabin warmup mode the rear-to-front airflow control door is arranged to block airflow generated by the rear blower from flowing to the rear foot outlet.

19. The HVAC system of claim 17, wherein in the passenger cabin warmup mode the rear-to-front airflow control door is arranged to direct airflow from the rear blower to both the rear foot outlet and the front foot outlet.

20. The HVAC system of claim 17, wherein:
the HVAC case further defines a defrost outlet;
a defrost airflow control door controls airflow through the defrost outlet; and
in the passenger cabin warmup mode the defrost airflow control door is open, and the rear-to-front airflow control door is arranged to allow airflow from the rear blower to flow through the defrost outlet.

* * * * *